(12) United States Patent
Grgic et al.

(10) Patent No.: US 7,424,327 B2
(45) Date of Patent: Sep. 9, 2008

(54) SYSTEM AND METHOD FOR AUTOMATICALLY MATCHING PROGRAMMABLE DATA OF DEVICES WITHIN AN INDUSTRIAL CONTROL SYSTEM

(75) Inventors: Richard J. Grgic, Painesville, OH (US); Fabio Malaspina, Twinsburg, OH (US); Brian A. Batke, Novelty, OH (US); Harcharan Rajagopal, Mayfield Heights, OH (US); David M. Callahan, Kirkland, WA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 270 days.

(21) Appl. No.: 11/342,467

(22) Filed: Jan. 30, 2006

(65) Prior Publication Data

US 2006/0178757 A1 Aug. 10, 2006

Related U.S. Application Data

(60) Provisional application No. 60/650,325, filed on Feb. 4, 2005.

(51) Int. Cl.
  G05B 15/02 (2006.01)
  G05B 11/01 (2006.01)
(52) U.S. Cl. .......................... 700/9; 700/20
(58) Field of Classification Search ............... 700/3, 700/9, 19, 20, 52
See application file for complete search history.

(56) References Cited

U.S. PATENT DOCUMENTS

| | | | |
|---|---|---|---|
| 5,805,442 A * | 9/1998 | Crater et al. | 700/9 |
| 6,515,683 B1 * | 2/2003 | Wright | 715/772 |
| 6,640,140 B1 * | 10/2003 | Lindner et al. | 700/18 |
| 7,079,984 B2 * | 7/2006 | Eryurek et al. | 702/185 |
| 7,146,408 B1 * | 12/2006 | Crater et al. | 709/219 |

* cited by examiner

*Primary Examiner*—Thomas K Pham
(74) *Attorney, Agent, or Firm*—Boyle Fredrickson; R. Scott Speroff (57) ABSTRACT

An industrial control system includes a central controller having a memory containing programmable data including operating programs for operating the controller, control program for controlling an industrial process, and configuration data configuring values used by the operating program and control program. The central controller is designed to control multiple devices also having memory holding programmable data including operating programs and configuration data. A program is executable by the central controller that causes the central controller to identify memories distributed through the industrial control system having programmable data and collect the programmable data from the memories. Accordingly, the collected programmable data may be used to substantially recreate operation of the industrial control system in a second industrial control system having another central controller substantially identical to the industrial controller and multiple devices connected to the central controller.

27 Claims, 6 Drawing Sheets

Figure 1:
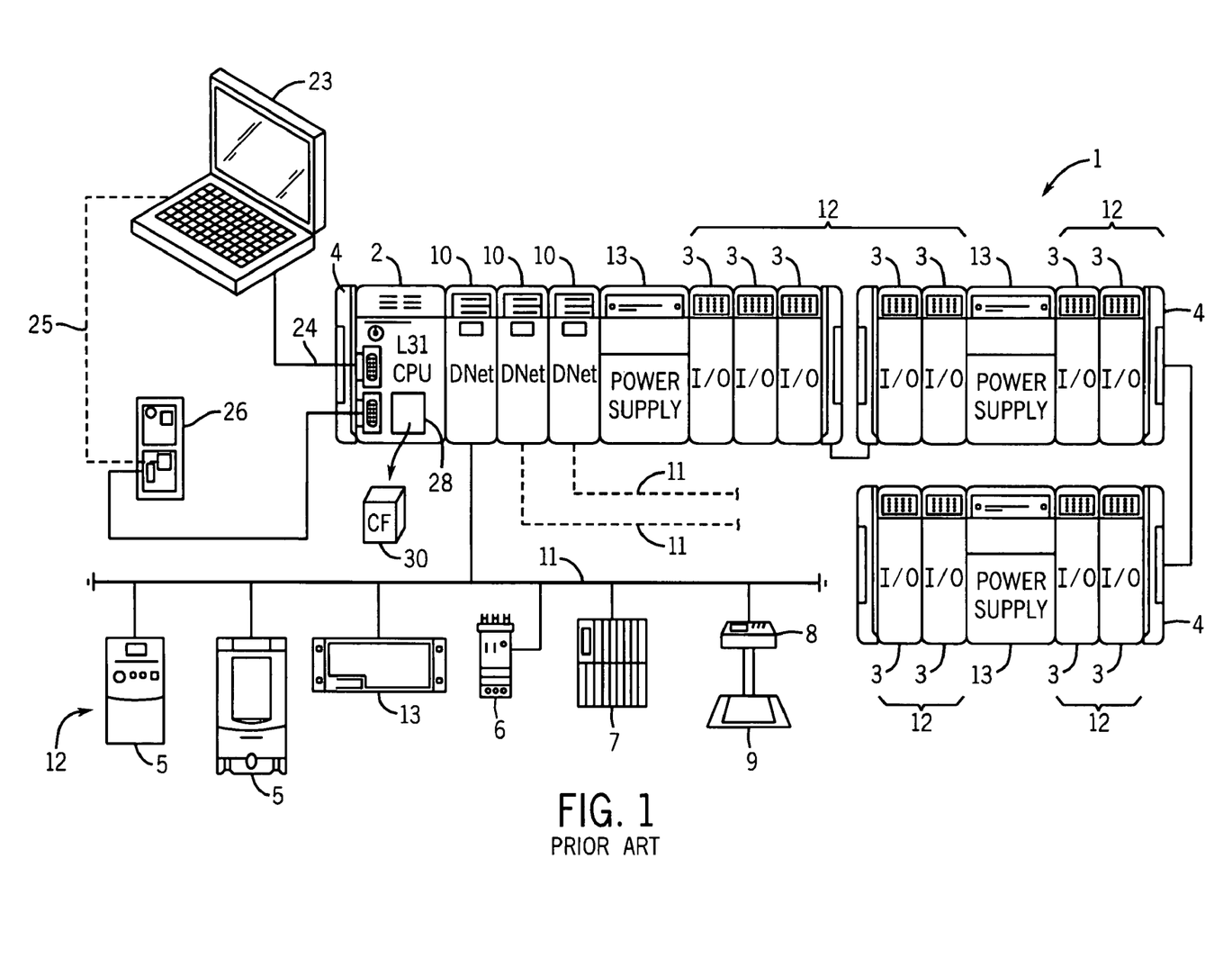
FIG. 1 is a schematic diagram of a prior-art industrial control system.

FIG. 6 ns, the user can configure the individual components of the industrial control system 1 to communicate and execute as desired. To do so, specialized software is executed on the computer 23 to communicate with the industrial controller 1 and the devices 12 of the industrial control system 1 and compile an accurate listing of the characteristics of each device 12 in the industrial control system 1 and how it is connected. That is, the programmer uses the computer 23 to identify the hardware information 22 and the individual programmable data. For example, programs such as RSLogix 5000, commercial available from Rockwell Automation, 1201 S. Second St., Milwaukee, Wis. 53204, may be utilized to perform these programming procedures.

SYSTEM AND METHOD FOR AUTOMATICALLY MATCHING PROGRAMMABLE DATA OF DEVICES WITHIN AN INDUSTRIAL CONTROL SYSTEM

CROSS-REFERENCE TO RELATED APPLICATIONS

This application is based on provisional application 60/650,325 filed Feb. 4, 2005, and entitled "ControlLogix Firmware Supervisor" and claims the benefit thereof.

STATEMENT REGARDING FEDERALLY SPONSORED RESEARCH OR DEVELOPMENT

--

BACKGROUND OF THE INVENTION

The present invention relates generally to industrial control systems and, more particularly, to a system and method for automatically updating data of devices within an industrial control system. Using the invention, an industrial control system may be efficiently cloned or a given industrial control system may automatically maintain desired firmware versions and programmable data on devices distributed across the industrial control system.

Industrial control systems are used in a variety of automation applications, such as manufacturing and materials handling. Referring to FIG. 1, an industrial control system 1 includes an industrial controller 2 in communication with a plurality of I/O modules 3 through a backplane 4. The industrial controller 2 is also in communication with a plurality of additional devices that may include network storage devices 5, an overload relay 6, a network expander 7, and an interface 8 for integrating additional components, such as a third-party scale 9. To facilitate communication with these components 5, 6, 7, 8, 9, the industrial control system 1 includes one or more network controllers 10, such as Ethernet controllers, DeviceNet controllers, ControlNet controllers, FireWire controllers, or FieldBus controllers that allow communication over one or more communication lines 11. Therefore, the industrial controller 2 can control a variety of devices, generally designated 12, that may include I/O modules 3 and additional components 5, 6, 7, 8, 9. The industrial controller 2, network controllers 10, and devices 12 are powered by respective power supplies 13.

Figure 2:
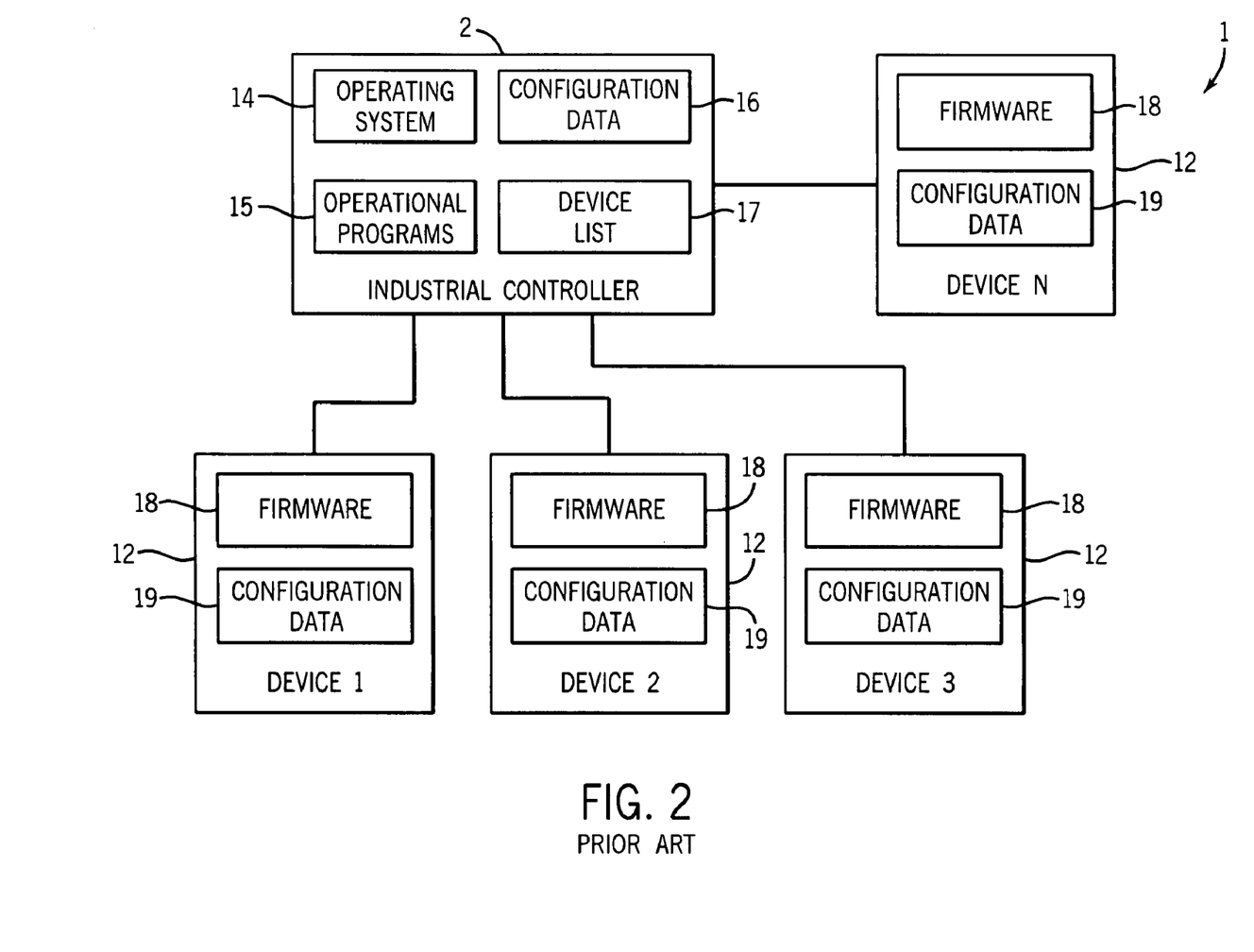
FIG. 2 is a schematic diagram of an architectural software layout of the industrial control system.

Referring now to FIG. 2, the industrial control system 1 includes a variety of software. In general, the industrial controller 2 includes an operating system 14 that controls the operation of the industrial controller 2, operational programs 15 that are executed by the industrial controller 2 to operate the industrial control system 1, configuration data 16 that forms a record of user-selected preferences, and a device list 17 that serves as a map of devices, device types, and locations of all devices within the industrial control system 1. As will be described, the industrial controller 2 relies upon each piece of software 14, 15, 16, 17 to generate commands that are communicated to each of the devices within the industrial control system 1 to control operation of the industrial control system 1. In this regard, each device 12 includes firmware 18 and configuration data 19 that, as will be described, allows the device 12 to execute the commands received from the industrial controller 2 in the manner desired.

When the industrial controller 2 executes the operational program 15, the operating system 14 and configuration data 16 are used to generate commands that are communicated to the devices 12 using the device list 17. When received by a particular device 12, the device 12 uses the firmware 18 and the configuration data 19 to interpret and carryout the instructions contained in the commands. In this regard, the firmware 18 and the configuration data 19 controls how the device 12 interprets the commands and translates those commands into actions taken by device 12.

Figure 3:
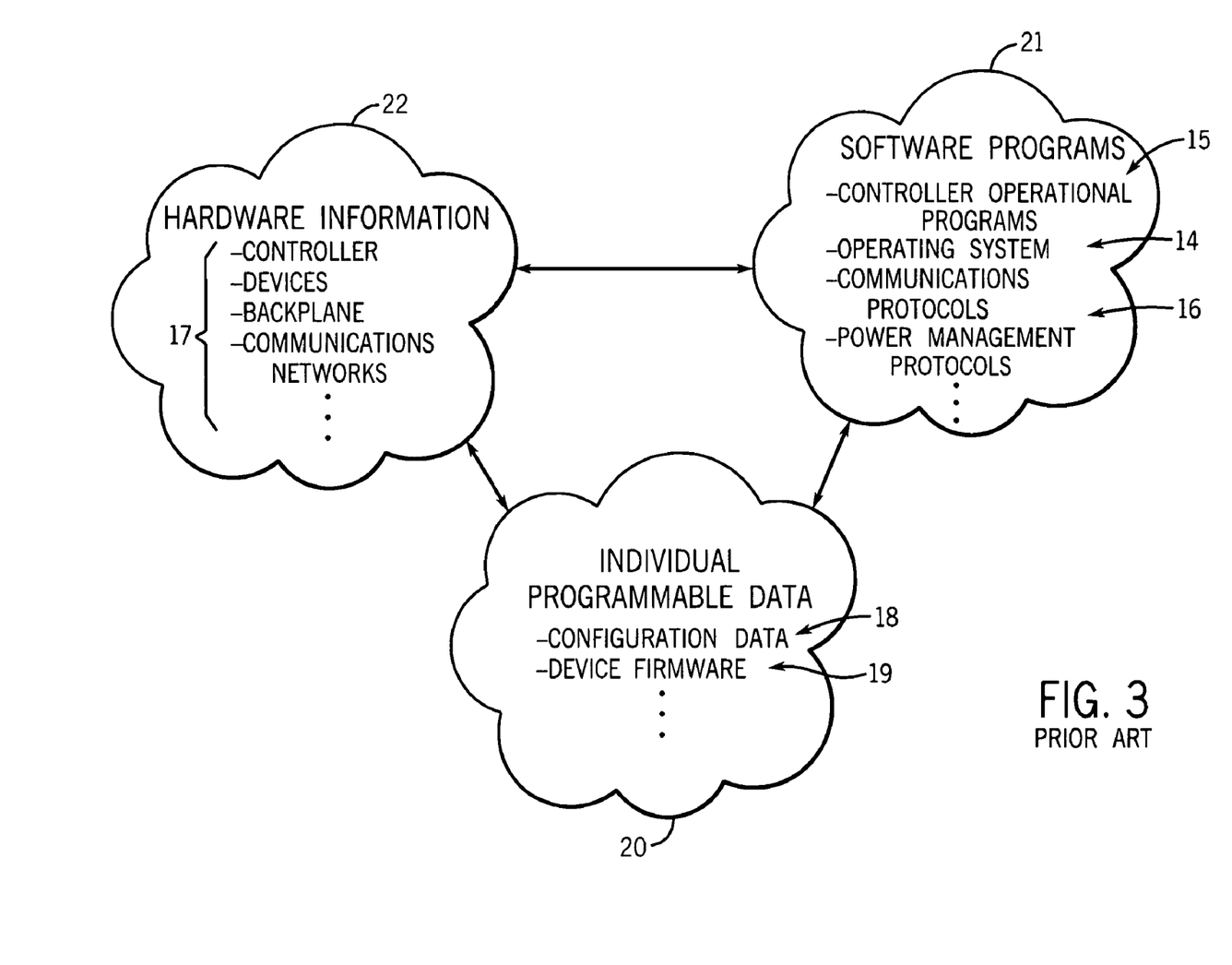
FIG. 3 is a pictorial representation of the interaction of fundamental software components of the industrial control system.

Referring now to FIG. 3, the firmware 18 and configuration data 19 form one of the three fundamental characteristics of an industrial control system. In particular, the firmware 18 and configuration data 19 form individual programmable data 20 or data that is specific to a particular device. The individual programmable data 20 is distinguishable from software programs 21, such as operational programs 15 used by the industrial controller, that form the second characteristic of an industrial control system. As will be described, in traditional industrial control system, the operating system 14 of the industrial controller is generally treated similarly to the operational programs 15, as are configuration data 16 and other software information stored locally in the industrial controller. Accordingly, these software components are all associated with software programs 21.

The individual programmable data 20 is also distinguishable from the third characteristic of industrial control systems, hardware information 22. The hardware information 22 may include information such as industrial controller type, individual module types, backplane type, communication network types, and the like. This information is used by the industrial controller to identify components in the industrial control system and communicate commands accordingly. In particular, this information generally forms the information stored as the device list 17 of FIG. 2

Referring now to FIGS. 1 through 3, it has been recognized that in order for an industrial control system to operate properly, the specifics of the hardware information 22, software programs 21, and individual programmable data 20 must work together. Accordingly, when building, changing, or updating the devices 12 of the industrial control system 1, a programmer uses a computer 23 having a direct communications link 24 to the industrial controller 1 or, alternatively, a remote communications link 25 through a remote-access modem 26 to the industrial controller 1. Though this communications link 24/25

Once the specific characteristics of each element of the industrial control system 1 is known, the programmer can then use the computer 23 and the specialized software to develop the software programs 21, for example the operational program 15, to operate the industrial control system 1. For example, by knowing the specific programmable data 20 and hardware information 22 of a given device 12, the programmer can compile the commands required to cause the device 12 to operate in the manner desired. That is, since the manner in which a given device 12 will interpret a command and the actions taken in response to such a command are dictated by the configuration data 18 and the firmware 19 of the device 12, the instructions should consider the particular characteristics of the device 12. Once the initial compilation of the operating program 15 has been completed, the programmer transfers it from the computer 23 to the industrial controller 2.

In an effort to backup and protect these highly specialized programs, some industrial controllers 2 include a port 28 configured to receive a removable storage medium 30, such as a compact flash card. The removable storage medium 30 may be inserted into the port 28 whereby the software programs 21 developed on the computer 23 and downloaded onto the industrial controller 2 can be automatically backed up onto the removable storage medium 30. Similarly, in some industrial controllers 2, the hardware information 22 stored on the industrial controller 2 may be backed up onto the removable storage medium 30. In this regard, some industrial controllers 2 are designed to backup all the information stored on the industrial controller onto the removable storage medium 30.

However, as industrial control systems 1 have evolved, they increasingly rely upon distributed intelligence. That is, much of the information processing and configuration data is not stored in the industrial controller 2 alone. Rather, a fair amount of the information traditionally stored in the industrial controller 2 has been distributed across the devices 12 of the industrial control system 1. As such, the individual programmable data 20 of each device 12 has gained added importance in governing the overall functionality of the industrial control system 1.

In this regard, it may be necessary to adjust the programmable data of a device 12, for example, changing firmware 19 or setting the configuration data 18, so that device 12 will properly respond to commands sent by the industrial controller 1. In this regard, the programmer can use the computer 23 and software, such as Firmware Supervisor, commercial available from Rockwell Automation, to reconfigure the programmable data of the device 12.

For example, if the device 12 is a scale 9, the configuration data 18 may be set to indicate an overweight condition at 1,500 pounds (lbs) and the firmware of the scale 9 may be configured to send an alarm to the industrial controller 2 whenever the scale 9 indicates an undesired weight. Accordingly, the operational program 15 may be designed to process and handle alerts from the scale 9 indicating an overweight condition indicating a weight in excess of 1,500 lbs. In this regard, should the configuration data 18 or firmware 19 later be changed, overweight alarms may be sent at different weights than expect by the industrial controller 2, which can cause the industrial control system 1 to function improperly. As such, prior art systems require configuration data 18 or firmware 19 to be matched to that expected by the industrial controller 2, else the industrial controller 2 will refuse to communicate with the device 12.

As such, when a replacement device 12 is required, the programmer must identify the individual programmable data 20 of the original device 12 being replaced and, if not included in the replacement device 12, reconfigure the replacement device 12 to include that programmable data 20. This can be a particularly arduous process especially if the programmable data 20 was not previously stored elsewhere or if the necessary programmable data 20 is outdated and not widely available. Furthermore, this can be a particularly costly process due to the expense of a programmer as well as any down time caused by the module requiring replacement.

Therefore, it would be desirable to have a system and method for maintaining individual or localized programmable data of each module in an industrial control system.

BRIEF SUMMARY OF THE INVENTION

The present invention overcomes the aforementioned drawbacks by providing a system and method for collecting and storing programmable data for each device in an industrial control system. This stored programmable data can then be utilized to automatically match programmable data of a given device in the industrial control system based on the identity of that device. Accordingly, an industrial control system may be effectively and efficiently cloned or replacement devices may be automatically configured to operate in place of the original device.

In accordance with one aspect of the invention, an industrial control system is disclosed that includes a central controller having a memory containing programmable data including operating programs for operating the controller, control program for controlling an industrial process, and configuration data configuring values used by the central controller. The central controller is designed to control multiple devices also having memory holding programmable data including operating programs and configuration data. A program is executable by the central controller that causes the central controller to identify memories distributed through the industrial control system having programmable data and collect the programmable data from the memories. Accordingly, the collected programmable data may be used to substantially recreate operation of the industrial control system in a second industrial control system having another central controller substantially identical to the industrial controller and multiple devices connected to the central controller.

In accordance with another aspect of the invention, a computer program is disclosed that, when executed by an industrial controller arranged in an industrial control system, causes the industrial controller to request identity information from each of a plurality of modules in the industrial control system. The industrial controller is also caused to compare the identity information of each of the modules to stored identity information. Accordingly, if the identity information of a module in the industrial control system does not match the stored identity information, the industrial controller is caused to automatically send a reconfiguration package to the module to reconfigure the module to match the stored identity information.

In accordance with yet another aspect of the invention, a method of automatically maintaining firmware versions in an industrial control system having an industrial controller and a plurality of modules is disclosed. The method includes configuring the industrial controller to automatically request a current firmware version from each of the plurality of modules and configuring the industrial controller to compare the current firmware version of each of the plurality of modules to a list of desired firmware for each of the plurality of modules accessible to the industrial controller. The method also includes configuring the plurality of modules to automatically change the current firmware version to the desired firmware version upon receiving the desired firmware version from the industrial controller.

In accordance with still another aspect of the invention, a system for maintaining consistent firmware versions across a plurality of modules in an industrial control system is disclosed. The system includes an industrial controller configured to automatically request a current firmware version of each module in the plurality of modules and a memory module engaged with the industrial controller and having stored thereon a list of desired firmware versions. The industrial controller is configured automatically compare the current firmware version of each module in the plurality of modules and send a desired firmware version to each module in the plurality of modules that has a current firmware version not included on the memory module.

Various other features of the present invention will be made apparent from the following detailed description and the drawings.

DETAILED DESCRIPTION OF THE INVENTION

Figure 4:
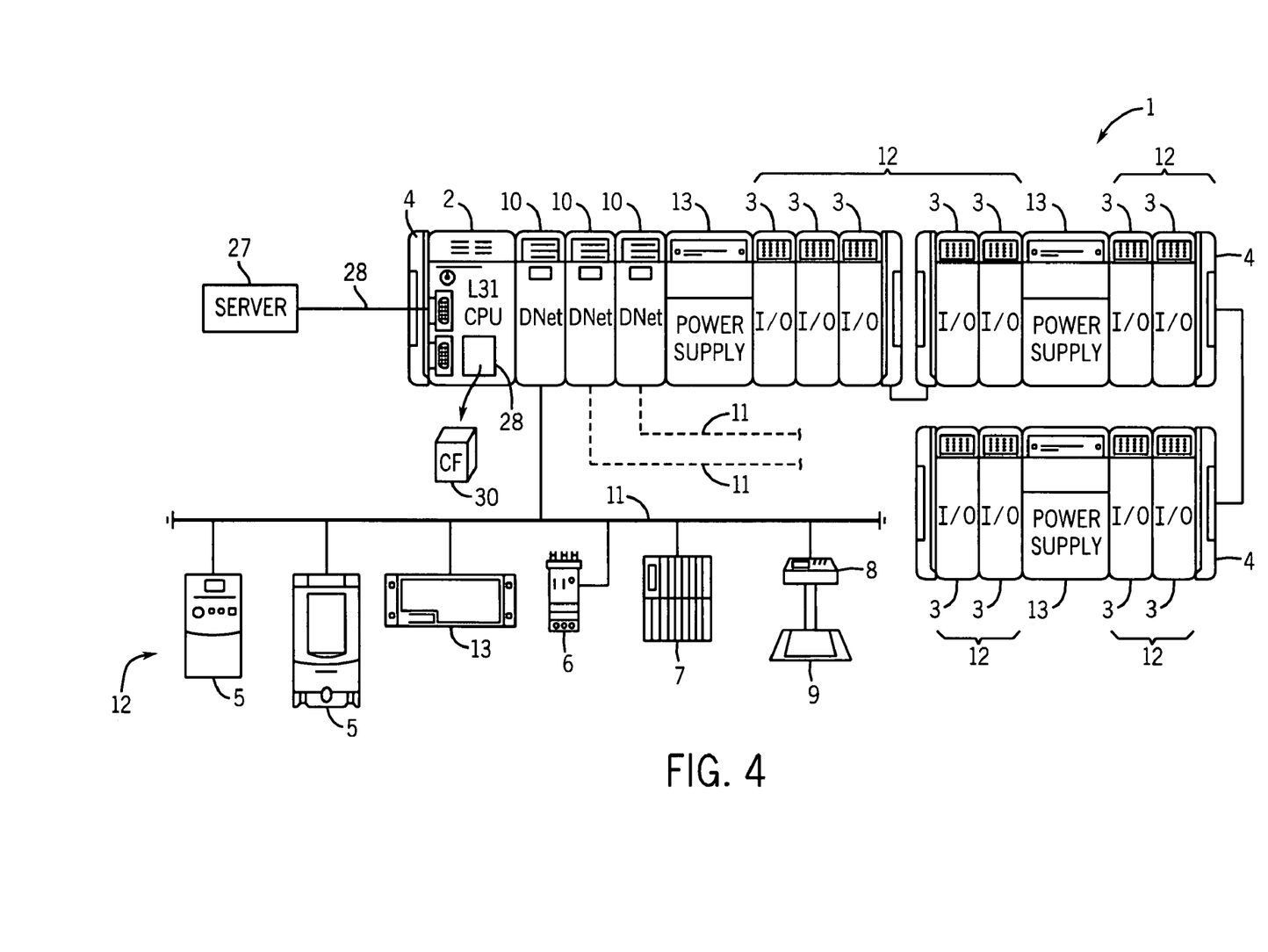
FIG. 4 is a schematic diagram of an industrial control system in accordance with the present invention.

Referring now to FIG. 4, the industrial control system 1 includes a data port 28 configured to facilitate bi-directional access to the removable storage device 30, preferably including non-volatile memory. That is, as previously described, the industrial controller 2 is configured to utilize the removable storage device 30 as a medium on which to store backups of the program that the industrial control system 1 executes and hardware information, such as module type and module manufacturer information. In this regard, it is contemplated that the industrial controller 2 may be compatible with programs such as ControLogix or ControlFlash, commercial available from Rockwell Automation.

Beyond storing operational programs and hardware data, the removable storage device 30 may also store individual programmable data for each module in the industrial control system 1. Therefore, the industrial controller 2 can access the programmable data stored on the removable storage device 30 and use that information to automatically reconfigure devices 12 within the industrial control system 1. Alternatively, it is contemplated that the desired programmable data may be stored remotely from the industrial controller 2, such as on a file server 27 that is accessible by the industrial controller 2 over an intranet or the internet 28. As will be described, this process may be utilized to facilitate cloning of a given industrial control system 2 or to automatically reconfigure a replacement module that has been inserted into the industrial control system 1 to properly operate as an replacement for the prior device 12.

In particular, as will be described, the industrial controller 2 is configured to automatically identify and maintain the components of the industrial control system 1 based on all three fundamental characteristics for each component in the industrial control system 1. That is, unlike prior art system such as those described with respect to FIGS. 1-3, individual programmable data 20 including configuration data 18 and firmware 19 can be backed up onto the removable storage device 30. By enabling the programmable data 20 to be included on the removable storage device 30, as will be described, industrial controllers can be configured to automatically access the programmable data 20 and use this information to automatically reconfigure replacement modules or build a clone of a given industrial control system. In this regard, the process of reconfiguring a replacement device or building a clone of a given industrial control system is not only further facilitated but may even be automated so that human interaction with the industrial control system by a programmer utilizing specialized software may be reduced or, in some cases, even a eliminated.

Figure 5:
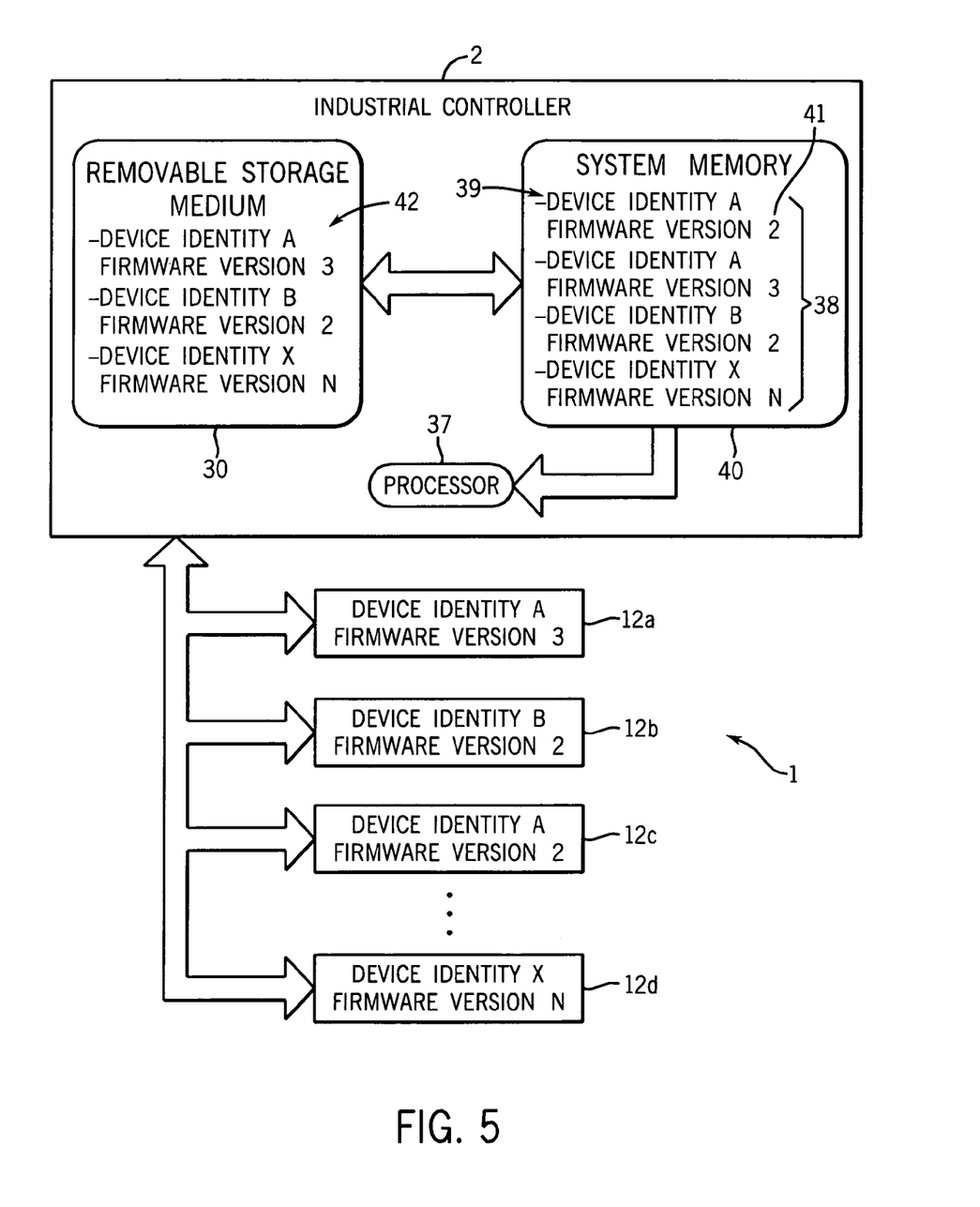
FIG. 5 is a schematic representation showing the interactions of some of the sub-components of the industrial control system of FIG. 1.

Referring now to FIG. 5, the industrial controller 2 is in communication with each device 12a, 12b, 12c, 12d in the industrial control system 1. In this regard, the industrial controller 2 requests identity information from each individual device 12a, 12b, 12c, 12d in the industrial control system 1. When received by the industrial controller 2, the identity information is processed by a processor 37 to compile a device list 38 that is stored in a system memory 40 of the industrial controller 12. The device list 38 is a list that includes device identity information 39 and associated in programmable data 41 communicated by each device 12a, 12b, 12c, 12d.

For example, when a given device 12a in the industrial control system 1 receives a request from the industrial controller 2 for identity information, the device 12a responds by communicating that it is a device having "Identity A" and includes programmable data such as a firmware version of "Version 3". Upon receipt, the processor 37 integrates the information 39, 41 communicated by the device 12a into the device list 38. Therefore, each entry in the device list 38 includes the module identity 39, such as module type and manufacturer information, and corresponding programmable data 41, for example, a firmware version.

When the removable storage medium 30 is engaged with the industrial controller 2, the information in the device list 38 is compared against a list 42 of desired information stored on the removable storage medium 30. In this regard, for example, the industrial controller 2 can immediately identify that the device 12c having "Identity A" and firmware "Version 2" is incorrect because the list 42 of desired characteristics stored on the removable storage medium 30 indicates that a device having "Identity A" should have firmware "Version 3". Therefore, as will be described with respect to FIG. 5, the industrial controller 2 can transmit the desired firmware "Version 3" from the removable storage device 30 to device 12c to replace incorrect firmware "Version 2" residing thereon.

Figure 6:
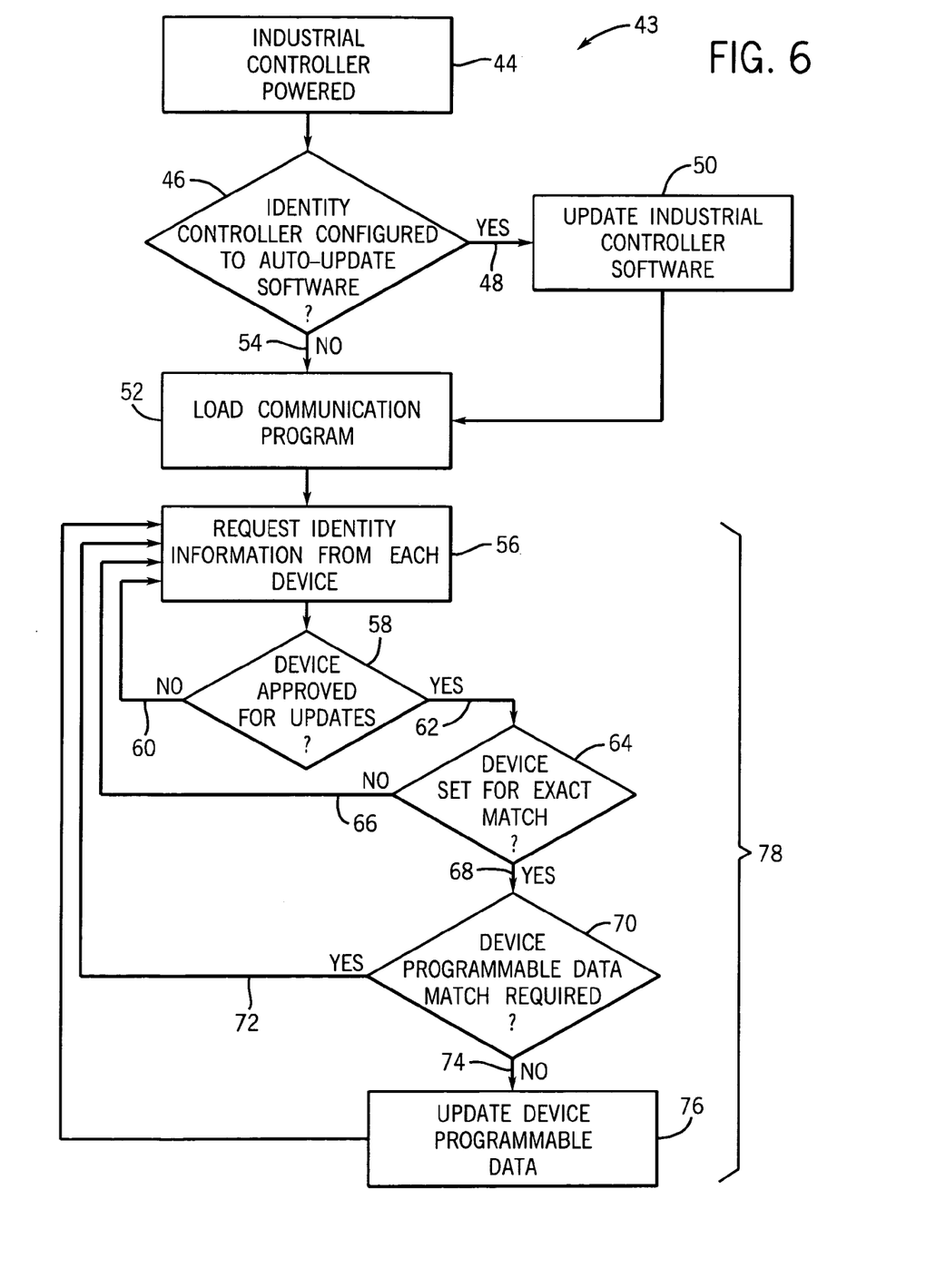
FIG. 6 is a flow chart setting forth the steps of a process for maintaining the programmable data of individual devices within an industrial control system in accordance with the present invention.

Referring now to FIG. 6, a process for supervising and maintaining programmable data across a plurality of devices in an industrial control system 43 begins when the industrial controller is powered 44. The industrial controller then determines whether it is currently configured to update its software automatically 46. In this regard, the software of the industrial controller may include an operating program, a control program, and/or configuration data. If so 48, the industrial controller automatically loads the most recent software currently available 50 and then continues its power-on sequence by loading a communications program 52. On the other hand, if the industrial controller is not configured to automatically update its software 54, the update sequence 50 is bypassed and the industrial controller continues by loading the communication program 52.

Once capable of communication with other components within the industrial control system by loading the communications program 52, the industrial controller requests identity information from each device in the industrial control system 56. When this information is received for a given device, the industrial controller determines whether that device is approved for updates 58. This may be done by accessing a list of device identities currently approved for updates or, update approval information may be simply embedded in or associated with the identity information received from the device 56. If the device is not approved for updates 60, the industrial controller discontinues the update process for that devices and continues by determining whether other devices are approved for updates 58.

When a device is identified that is approved for updates 62, the industrial controller then determines whether that devices is set for exact matching of programmable data 64. If the device is not set for exact matching of programmable data 66, the industrial controller again discontinues the update process for that devices and continues by determining whether other devices are approved for updates 58 and set for exact matching 64.

Once a device that is set for exact matching of programmable data is identified 68, the industrial controller determines whether the current device programmable data associated with the identity information transmitted by the device matches a desired programmable data associated with the particular devices identity 70.

It is contemplated that this information may be stored on the removable storage device and randomly accessed by the industrial controller or may be preloaded from the removable storage device as part of the software update 50. Alternatively, it is contemplated that the desired programmable data may be stored remotely from the industrial controller, such as on a file server that is accessible by the industrial controller over an intranet or the internet.

If the current programmable data matches the stored programmable data 72, no further action with respect to that device is required and the industrial controller simply continues with its iterative and periodic requests for identity information from each device 56. On the other hand, if the current programmable data does not match the stored programmable data for that particular device, the industrial controller automatically accesses the desired programmable data and sends that programmable data to the particular device 76. The programmable data may include configuration data as well as firmware or a combination thereof. In either case, the device responds by replacing previous programmable data with the current programmable data sent by the industrial controller 76.

It is contemplated that a reconfiguration package or firmware kit may be pushed from the industrial controller to the device requiring updating. This package may including a self-executing program that, upon receipt at the device, is automatically executed to update the programmable data 76. Alternatively, an update, for example a firmware update, may be sent to the device and, in response, the device may execute a self-update procedure to install the firmware update, for example, by copying an image of the firmware update into memory.

It is contemplated that this firmware supervisor process 78 for checking and maintaining programmable data across the devices of the industrial control system 78 may be iteratively and periodically performed. That is, the industrial controller may be configured to repeatedly work through the loops within the firmware supervisor process 78 to continuously check whether the current programmable data of each device matches the desired programmable data.

Accordingly, it is possible to immediately and automatically update the programmable data of a replacement device engaged with the industrial control system without the need for a programmer to utilize a separate computer system to manually perform such a process. In this regard, "headless" updates can be performed. Furthermore, it is contemplated, that this updating and maintenance process may be performed during operation of the industrial control system, whereby replacement devices may be automatically updated without the industrial control system being required to be shut down. Accordingly, the devices may be "hot swappable."

Alternatively, rather than performing the device checking and update process 78 iteratively and periodically, it may be performed upon occurrence of a specific event. For example, the process 78 may be initiated in response to a system power on event, an industrial controller power on event, a device replacement event, a device power on event, a removable memory engagement event, a communications loss event, a memory failure event, expiration of a time limit, or user initiation such as by a pushbutton or the like.

Therefore, a system and method for collecting and storing programmable data for each device in an industrial control system is created. This stored programmable data can then be utilized to automatically match programmable data of a given device in the industrial control system based on the identity of that device. Accordingly, an industrial control system may be effectively and efficiently cloned or replacement devices engaged with the industrial control system can be automatically updated without requiring a user or programmer to manually reconfigure the programmable data.

The present invention has been described in terms of the preferred embodiments, and it should be appreciated that many equivalents, alternatives, variations, and modifications, aside from those expressly stated, are possible and within the scope of the invention. Therefore, the invention should not be limited to a particular described embodiment.

We claim:

1. In an industrial control system providing a central controller having a memory containing programmable data including operating programs for operating the central controller, control program for controlling an industrial process, and configuration data configuring values used by the central controller, the central controller controlling multiple devices also having memory holding programmable data including configuration data, the improvement comprising:

a program executable by the central controller to: identify memories distributed through the industrial control system having programmable data; and collect the programmable data from the memories; and wherein the collected programmable data may substantially recreate operation of the industrial control system in a second industrial control system having another central controller substantially identical to the central controller and multiple devices connected to the central controller.

2. The industrial control system of claim 1 further comprising a device list accessed by the central controller to identify the memories.

3. The industrial control system of claim 1 wherein the program is executable by the another central controller to substantially clone the industrial control system by distributing the collected programmable data across the memories of the multiple devices of the second industrial control system.

4. The industrial control system of claim 1 wherein the program is executable by the central controller to automatically distribute at least a portion of the collected programmable data to a given device replacing at least one of the multiple devices.

5. A computer program stored on a computer readable medium comprising instructions that, when executed by an industrial controller arranged in an industrial control system, causes the industrial controller to:

request identity information from each of a plurality of modules in the industrial control system;

compare the identity information of each of the modules to stored identity information; and send a reconfiguration package from the industrial controller to the module to reconfigure the module to match the stored identity information if the identity information of a module in the industrial control system does not match the stored identity information.

6. The program of claim 5 wherein the identity information includes a current firmware version and the stored identity information includes a desired firmware version and wherein, if the current firmware version does not match the desired firmware version, the reconfiguration package includes the desired firmware.

7. The program of claim 6 wherein the industrial controller is further caused to:

determine whether each module has been designated for exact firmware version matching; and send the desired firmware version only if the module is designated for exact firmware version matching.

8. The program of claim 5 wherein the identity information includes a module type and wherein the industrial controller is further caused to:

determine whether the module type of each of the modules is listed in the stored identity information as approved for identity matching; and send the reconfiguration package to the module only if the module type listed in the stored identity information as approved for identity matching.

9. The program of claim 5 wherein the identity information includes a module brand and wherein the industrial controller is further caused to:

determine whether the module brand of each of the modules is listed in the stored identity information as approved for identity matching; and send the reconfiguration package to the module only if the module brand is listed in the stored identity information as approved for identity matching.

10. The program of claim 5 further comprising a memory unit engaged with the industrial controller and wherein the identity information is stored on the memory unit and accessible by the industrial controller.

11. The program of claim 10 wherein the memory unit includes a removable non-volatile memory unit.

12. The program of claim 10 wherein the memory unit includes a removable compact flash unit.

13. The program of claim 5 wherein the reconfiguration package is automatically sent from the industrial controller to the module during operation of the industrial control system.

14. The program of claim 5 wherein industrial controller is further configured to request and compare the identity information from each of the modules to the stored identity information automatically upon at least one of a system power on event, a industrial controller power on event, a module replacement event, a module power on event, a removable memory module engagement event, a memory failure event, an expiration of a time limit, a communication loss event, and a user initiation event.

15. A method of automatically maintaining firmware versions in an industrial control system having an industrial controller and a plurality of modules, the method comprising the steps of:

configuring the industrial controller to automatically request a current firmware version from each of the plurality of modules;

configuring the industrial controller to compare the current firmware version of each of the plurality of modules to a list of desired firmware for each of the plurality of modules accessible to the industrial controller; and configuring the plurality of modules to automatically change the current firmware version to a desired firmware version upon receiving the desired firmware version from the industrial controller.

16. The method of claim 15 further comprising the step of configuring the industrial controller to automatically request a module type of each of the plurality of modules and communicate the desired firmware version to a module only if the current firmware version of the module is not the desired firmware version and the module type is an approved module type.

17. The method of claim 15 further comprising the step of configuring the industrial controller to automatically request a module brand of each of the plurality of modules and communicate the desired firmware version to a module only if the current firmware version of the module is not the desired firmware version and the module brand is an approved module type.

18. The method of claim 15 further comprising the step of configuring the industrial controller to automatically determine whether each of the plurality of modules has be pre-designated for firmware matching and communicate the desired firmware version to a module only if the current firmware version of the module is not the desired firmware version the and module has been pre-designated for firmware matching.

19. The method of claim 15 further comprising the step of configuring the industrial controller to periodically query each of the plurality of modules to determine whether the current firmware version is the desired firmware version.

20. The method of claim 15 further comprising the step of performing each step in response to at least one of a system power on event, a industrial controller power on event, a module replacement event, a module power on event, a memory module engagement event, a memory failure event, an expiration of a time limit, a communication loss event, and a user initiation event.

21. A system for maintaining consistent firmware versions across a plurality of modules in an industrial control system comprising:

an industrial controller configured to automatically request a current firmware version of each module in the plurality of modules;

a memory module engaged with the industrial controller and having stored thereon a list of desired firmware versions; and wherein the industrial controller automatically compares the current firmware version of each module in the plurality of modules and sends a desired firmware version to each module in the plurality of modules that has a current firmware version not included on the memory module.

22. The system of claim 21 wherein the memory module includes is removably engaged with the industrial controller.

23. The system of claim 21 further comprising a computer configured to receive the memory module and store the list of desired firmware versions thereon.

24. The system of claim 21 wherein industrial controller is further configured to request the current firmware version of each module in the plurality of modules and compare the current firmware version of each module in the plurality of modules to the desired version automatically upon at least one of a system power on event, a industrial controller power on event, a module replacement event, a module power on event, a memory module engagement event, an expiration of a time limit, a communication loss event, and a user initiation event.

25. The system of claim 21 wherein the memory module is located remotely from the industrial controller and accessible by the industrial controller by at least one of an intranet and an internet.

26. In an industrial control system providing a central controller having a memory containing programmable data including operating programs for operating the central controller, control program for controlling an industrial process, and configuration data configuring values used by the central controller, the central controller controlling multiple devices also having memory holding firmware version information and configuration information, the improvement comprising:

a program executable by the central controller to:
    receive a command to clone the industrial control system;
    request identity information from each of the multiple devices in the industrial control system, the identity information including at least one of the firmware version information and the configuration information stored in the memory of each device;
    compile the identity information from each of the multiple devices in the industrial control system; and
    store the compiled identity information to a memory module.

27. The industrial control system of claim 26 wherein the compiled identity information is configured to be accessed by another industrial controller to create a clone of the industrial control system.

* * * * *